United States Patent [19]

Kiyasu et al.

[11] 3,902,166

[45] Aug. 26, 1975

[54] MEMORY APPARATUS USING CYLINDRICAL MAGNETIC DOMAIN MATERIALS

[75] Inventors: Zeniti Kiyasu, Tokyo; Homare Tsuruhara, Hino, both of Japan

[73] Assignee: Iwatsu Electric Co., Ltd., Tokyo, Japan

[22] Filed: Sept. 17, 1973

[21] Appl. No.: 397,519

Related U.S. Application Data

[63] Continuation of Ser. No. 212,205, Dec. 27, 1971.

[30] Foreign Application Priority Data

Dec. 28, 1970 Japan ............ 46-127738
Dec. 28, 1970 Japan ............ 46-127739

[52] U.S. Cl. 340/174 YC; 340/174 GA; 340/174 TF; 350/151

[51] Int. Cl. ............ G11c 11/14

[58] Field of Search 340/174 TF, 174 YC, 174 GA; 350/151

[56] References Cited

UNITED STATES PATENTS

| | | | |
|---|---|---|---|
| 3,500,354 | 3/1970 | Smith et al. | 340/174 YC |
| 3,500,361 | 3/1970 | Cushner | 340/174 YC |
| 3,526,883 | 9/1970 | Tabor | 340/174 YC |
| 3,585,614 | 6/1971 | Tabor | 340/174 YC |
| 3,643,233 | 2/1972 | Fan et al. | 340/174 YC |
| 3,755,796 | 8/1973 | Griest, Jr. | 340/174 TF |
| 3,806,903 | 4/1974 | Myer | 340/174 YC |

OTHER PUBLICATIONS

Craig et al., IBM Technical Disclosure Bulletin, "Bubble Domain Electronic-to-Optical Image Transducer"; Vol. 13, No. 1, 6/70; pp. 147, 148.

Smith, IEEE Transactions on Magnetics, "Magnetic Films and Optics in Computer Memories"; Vol. MAG3, No. 3, 9/67, pp. 447, 448.

Chang et al., IBM Technical Disclosure Bulletin, "Magnetic Bubble Domain Display Device", Vol. 13, No. 5, 10/70; pp. 1187, 1188.

*Primary Examiner*—Stanley M. Urynowicz, Jr.
*Attorney, Agent, or Firm*—Woodcock, Washburn, Kurtz & Mackiewicz

[57] ABSTRACT

This invention relates to an electric apparatus using magnetic materials, comprising plural magnetic thin platelets provided with means for producing cylindrical magnetic domains in the predetermined regions of said magnetic thin platelets, means to irradiate said magnetic thin platelets with light, and means to detect the light transmitted through said magnetic thin platelets, wherein said plural magnetic thin platelets are arranged parallel to each other, and the existence of cylindrical magnetic domains in the said predetermined region of said magnetic thin platelets is determined by existence of light transmitted from said predetermined regions.

10 Claims, 27 Drawing Figures

FIG.1E
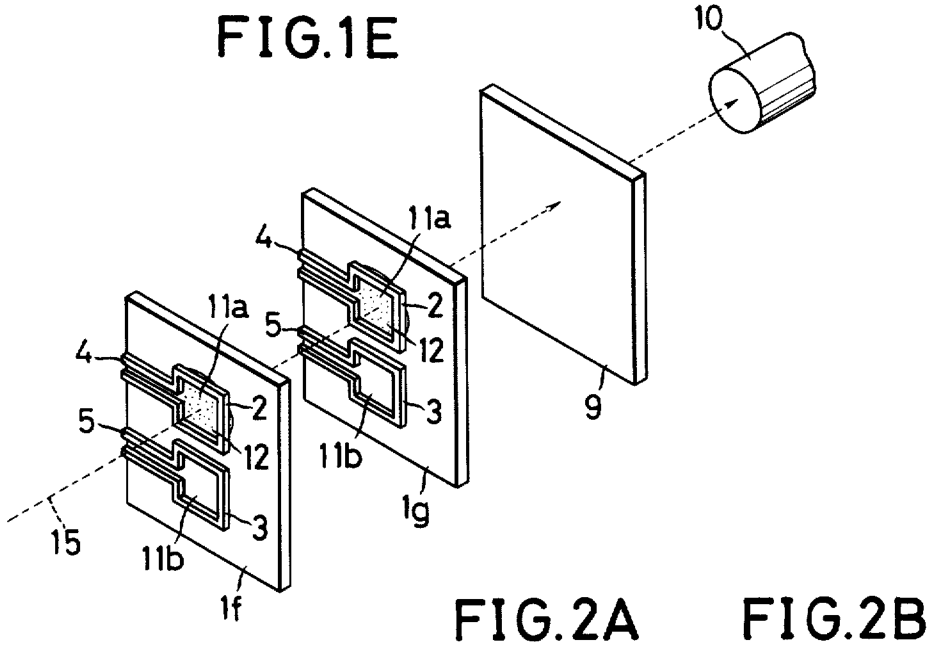
FIG.2A FIG.2B
FIG. 2A, FIG. 3
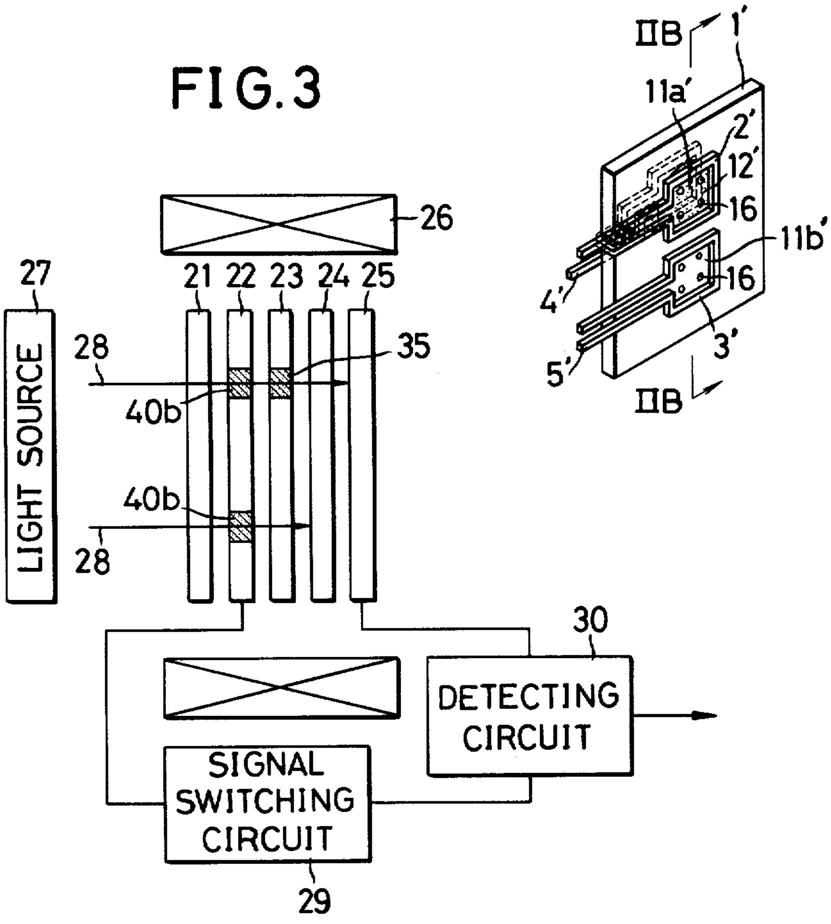
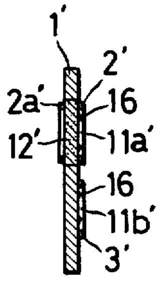

MEMORY APPARATUS USING CYLINDRICAL MAGNETIC DOMAIN MATERIALS

This is a continuation of application Ser. No. 212,205, filed Dec. 27, 1971.

BACKGROUND OF THE INVENTION

This invention relates to an electric apparatus using magnetic materials with a bubble-like shaped magnetic domain, namely a cylindrical magnetic domain, which will be called CMD hereafter.

It is already wellknown that by applying a magnetic bias field of the order of several tens oersted on the thin platelet of the single crystals of orthoferrites, for instance $Sm_{0.55}Tb_{0.45}FeO_3$, bubble-like shaped magnetic domains, namely CMD, with a diameter of the order of several tens of microns is generated in said thin platelet of orthoferrites. And also it is well known that CED is generated in the single crystals of Ytrium Aluminum Garnet. And further it is wellknown that the memory apparatus or magnetic logic devices could be fabricated, utilizing magnetic materials, in which said CMD could be generated. But it was difficult to obtain large single crystals of the magnetic materials in which said CMD could be generated. Therefore, with a small thin platelet of the single crystal magnetic materials, bits which could be handled by a single crystal thin platelet was restricted to relatively small numbers. And the apparatus comprising CMD has weak points such as the slow rate of movement of CMD, and inconvenience of reading and writing of information. And also it was rather difficult to detect the CMD in a predetermined region of the magnetic thin platelet.

BRIEF SUMMARY OF THE INVENTION

In accordance with one important aspect of the invention, an electrical apparatus is provided comprising a plurality of magnetic thin platelets arranged along a single central axis so as to form a stack and means for producing cylindrical magnetic domains on each of the platelets. The platelets carry pairs of conductive loop circuits so as to form rows of paired regions in a matrix where the rows extend in an X direction. The platelets also carry other conductive loop circuits so as to form rows of regions in a matrix extending in a Y direction where the regions in the Y-rows are respectively axially aligned with each of the paired regions in the X-rows. In order to selectively move the domain to one set of axially aligned regions including one of the paired regions from another set of axially aligned regions including the other of the paired regions, current is applied to one of the pairs of conductive loop circuits forming the one paired region while simultaneously applying current to one of the other conductive loop circuits forming the region axially aligned with the one paired region. The platelets are then irradiated with polarized light passing through each of the regions in a direction generally parallel to the axis with the rotation of the angle of the plane of polarization of the polarized light passing through the regions on each of the plates being detected to indicate the presence of domains in the regions.

In accordance with another important aspect of the invention, an electrical apparatus comprises a memory plate formed by a magnetic thin platelet and an address plate formed by a magnetic thin platelet disposed in generally parallel relation with the memory plate. The address plate carries a first conductive loop circuit which is the source of cylindrical magnetic domains, a plurality of second conductive loop circuits forming addressable regions and a pair of rectangular inner and outer conductive loop circuits located between the first loop circuit and the first of the second loop circuits for severing the domains in two sections between the first conductive loop circuit and the first of the second conductive loop circuits. The address plate carries a third conductive loop circuit for moving the domains on the last of the second conductive loop circuits to a region formed by the third conductive loop circuit. In operation, the addressable regions are scanned by the cylindrical magnetic domain by applying a current to the first conductive loop and then sequentially applying a current to the rectangular outer conductive loop circuit and to the rectangular inner conductive loop circuit. Current is then applied to the first conductive loop circuit, the rectangular inner conductive loop circuit and the first of the second conductive loop circuits. Multiphase current is applied to each of the second conductive loop circuits and a third conductive loop circuit to move the domains along the addressable regions to the region formed by the third conductive loop circuit. The memory plate includes means for moving the cylindrical magnetic domains in predetermined regions of the memory plate where the predetermined regions of the memory plate and the addressable regions of the address plate are aligned in a direction generally perpendicular to the address plate and the memory plate. Means are also provided for irradiating the memory plate and the address plate with plane polarized light passing therethrough in a direction generally perpendicular to the memory plate and the address plate. Detecting means detect the rotation of the angle of polarization of the plane of polarized light passing through the memory plate and the address plate to indicate the presence of domains in the predetermined regions of the memory plate.

BRIEF DESCRIPTION OF THE DRAWINGS

FIG. 1E is a schematic perspective view to illustrate the process of detection the CED in the magnetic memory apparatus shown in FIG. 1A;

FIG. 2A is a schematic perspective view of another embodiment of an MTP in accordance with this invention;

FIG. 2B is a cross-sectional view of the MTP taken about the line IIB—IIB in FIG. 2A;

FIG. 3 is a schematic front view of still another embodiment of a magnetic memory apparatus in accordance with this invention;

DESCRIPTION OF THE PREFERRED EMBODIMENTS

Figure 1A:
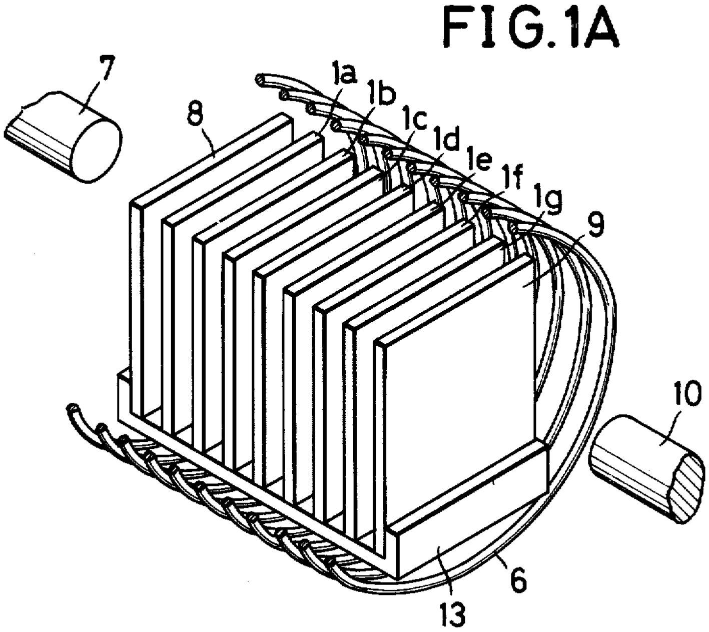
FIG. 1A is a schematic perspective view of one embodiment of a magnetic memory apparatus in accordance with this invention.
Figure 1B:
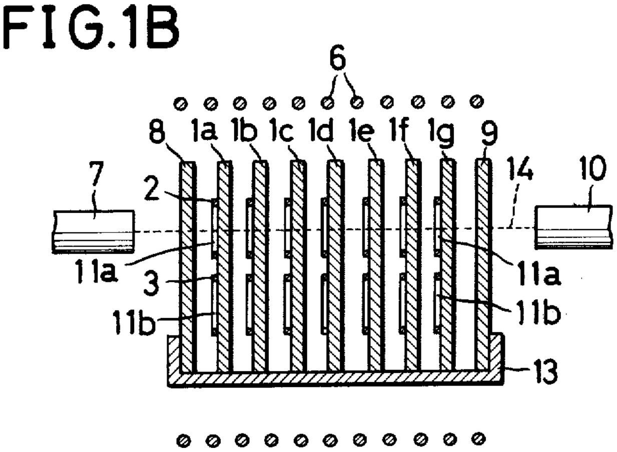
FIG. 1B is a schematic sectional view of the magnetic memory apparatus shown in FIG. 1A.

Referring to FIGS. 1A and 1B, a magnetic memory apparatus comprises a plural number of MTP 1*a*, 1*b*, 1*c*, 1*d*, 1*e*, 1*f* and 1g, a coil 6 to give the bias magnetic field, a light source 7, a polarizer plate 8, an analyser plate 9 and a light detector 10.

Figure 1C:
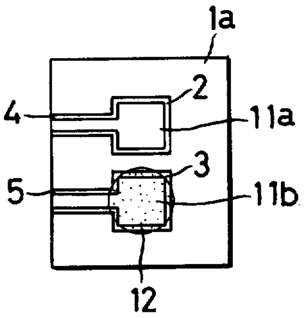
FIGS. 1C and 1D are plan views to illustrate both MTP and the movement of CMD in the MTP in the magnetic memory apparatus shown in FIG. 1A.
Figure 1D:
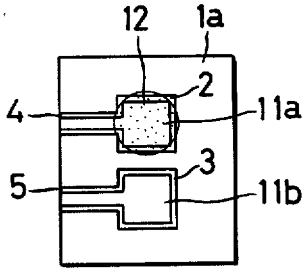

The MTP 1*a* – 1*g* are fabricated from orthoferrites, $Sm_{0.55}Tb_{0.45}FeO_3$, with a thickness of about 50 microns. As shown in FIGS. 1C and 1D, the MTP 1*a* is provided with CLC 4 and 5 to move and hold the CMD. The CLC 4 and 5 are fabricated by metallic thin films such as gold with width of about 12.5 microns and thickness of about one micron. The CLC 4 and 5 are provided with lead parts for a connection to an outer circuit and rectangular parts 2 and 3 which form regions 11a and 11b where the CMD will be provided. The diameter of each rectangular part 2 and 3 is about 87.5 microns and the distance between the centers of rectangular parts 2 and 3 is about 100 microns. In FIG. 10, CMD 12 is schematically shown in the region 11b. In FIG. 1D, CMD 12 is schematically shown in the region 11*a*. The other MTP 1*b*–1*g* are also fabricated similarly. As shown in FIG. 1B, the MTP 1*a*–1*g* are arranged parallel to each other by a holding means 13 so that the regions 11a of each MTP are all intersected by a line 14.

As shown in FIGS. 1A and 1B, the coil 6 for the purpose of applying the bias magnetic field is arranged to surround each of the MTP 1*a*–1*g*.

An optical system of this apparatus comprises the light source 7 with good parallelism fabricated from GaAs, the polarizer 8, the analyser 9, and the light detector 10 provided with a photo transistor, wherein the parallel light beam generated by the light source 7 is linearly polarized by the polarizer 8, transmit through the stack of MTP 1*a*–1*g*, transmit through analyser plate 9, and detected by the light detector 10. As shown in FIG. 1B, the optical system is provided to give the output signal from the light detector 10 if at least one of the MTP 1*a*–1*g* is occupied by the CMD 12 in the group of upper regions 11*a* as shown in FIG. 1D and the light beam is transmitted through a group of upper. And the optical system is provided to give no output signal from light detector 10 by Faraday effect if the CMD 12 in all of the MTP 1*a*–1*g* are moved to a group of lower regions 11*b* and no CMD 12 is present in the group of upper regions 11*a* and the light beam is transmitted through the group of upper regions 11*a*. Abovementioned constitution of said optical system to selectively give the output signal is achieved by the rotational adjustment of the light axis of the polarizer 8 and the analyser 9. The light source 7 is not limited to GaAs but it may also be fabricated from other light emitting diodes, semiconductor laser or other laser. The light detector 10 is also provided by photo diodes or any other suitable devices.

Now the method of operation and action of said apparatus will be described. By applying the bias magnetic field, for instance 60 oersted, to the MTP 1*a* - 1*g* by the coil 6, which is provided to give the bias field, CMD are generated in the MTP 1*a* – 1*g*. These CMD are generated in the regions 11*a* or 11*b* on the MTP at random. So the CMD 12 are moved by the effects of magnetic repulsion and attraction to be positioned in the state shown in FIG. 1C or 1D, and held therein. To move the CMD 12 existing in the region 11*b* as shown in FIG. 1C to the region 11*a*, the electric current of about 200 mA is passed through the CLC 4. And to move the CMD 12 existing in the regions 11a as shown in FIG. 1D to the regions 11*b*, the electric current of about 200 mA is passed through the CLC 5. By the abovementioned method the CMD 12 could be positioned selectively in the regions 11*a* or 11*b*. Therefore, the state in which the CMD 12 is not present in the regions 11a as shown in FIG. 1C could correspond to the logic value 0, and the state in which the CMD 12 is present in the region 11*a* as shown in FIG. 1D could correspond to the logic value 1. After positioning the CMD 12 in the group of regions 11*a* group of each of the MTP 1*a*– 1*g* by the above-mentioned method, the group of regions 11*a* is irradiated with incident light beam 15 as shown in FIG. 1E. If the CMD 12 is present in at least one of the group of regions 11*a* of the MTP 1*a*–1*g*, an output signal is obtained from the light detector 10. And if no CMD 12 is present in the region 11*a* of all of the MTP 1*a*–1*g*, no output signal is obtained from the light detector 10. This phenomenon is caused by the variation of angle of rotation of the plane of the polarization polarized by the polarized light with reference to the existence of the CMD. The circuit, by which the output signal is selectively obtained from the light detector 10 depending on the existence or nonexistence of CED, is the OR circuit. Above description is given with reference to the case in which the apparatus is used as OR circuit. It is possible to construct the apparatus to give the output signal also when CMD is present in all of the group of regions 11*a* by varying the set-up of the light axis of the polarizer 8 and the analyser 9, and variation of detecting condition. And though the above statement is described on the apparatus of most fundamental construction, more CLC could be provided on said MTP 1*a*–1*g* to obtain the distribution of many logic value 1 or 0 in matrix form.

One of the favorable features of said apparatus is the capability of processing a large quantity of information with relqtively small MTP 1*a*–1*g*, since the memory is storaged three dimensionally in the above-mentioned configuration of magnetic memory apparatus.

Now another embodiment of MTP for the abovementioned magnetic memory apparatus in accordance with this invention will be described with reference to FIGS. 2A and 2B, MTP 1' of this embodiment is provided with CLC 4' with rectangular part 2' and CLC 5' with rectangular part 3', similar to the MTP 1*a*–1*g* of said embodiment shown in FIGS. 1A, 1B, 1C and 1D. But in this embodiment, the CLC 4' is not only provided with the rectangular part 2' in the surface but also is provided with rectangular part 2a' on the reverse side. The MTP 1' is provided with four dots 16 of ferromagnetic thin film in each region which act to hold the CMD in stable state in regions 11a' and 11b'. The permalloy dots with thickness of 4000 A are suitable as the ferromagnetic dots 16. Now referring to the operation of the MTP 1' is the abovementioned configuration, the upper CLC 4' is provided with two rectangular parts 2' and 2a' so it acts as a two turn coil whereby could generate strong magnetic field. And when it is necessary to produce the state of logic value 1, that to have CMD exit, the current, nearly equal to the current flowing through the CLC 5' is let flow through the CLC 4', whereby a magnetic field of the value of about two times greater than the magnetic field generated by the rectangular part 3' is generated by the rectangular parts 2' and 2a', and CMD 12' present in the region 11b' receives attractive force by this magnetic field. Therefore, the CMD 12' moves to the upper region 11a' of the MTP 1', and the state of logic value 1 is obtained. By varying the current value flowing through CLC 4' to zero, the CMD 12' is brought back to the lower region 11b' by the effect of the magnetic field generated by the rectangular part 3', since current is let flow through the CLC 3' at all times.

Figure 4A:
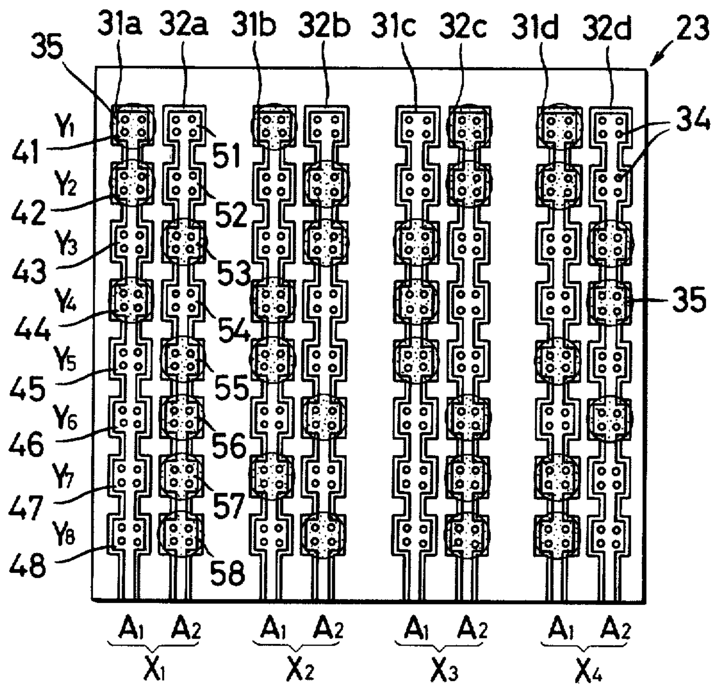
FIG. 4A is a plan view to illustrate the memory plate of magnetic thin platelet, which will be called MMTP hereafter, of the magnetic memory apparatus shown in FIG. 3.
Figure 4B:
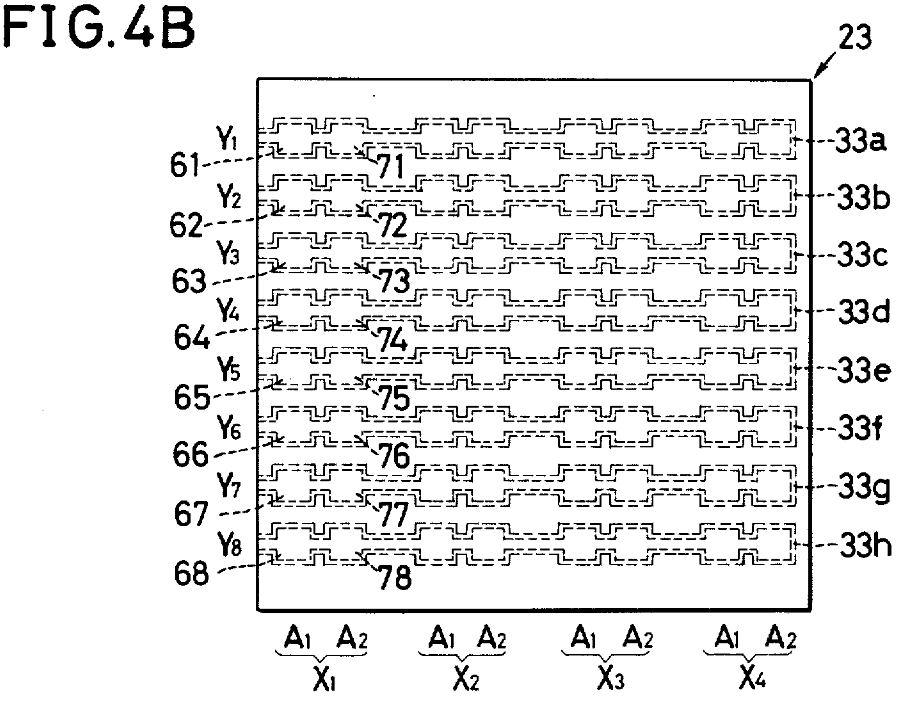
FIG. 4B is a plan view to show only the conductive loop circuit, which will be called CLC hereafter, on the reverse side of the MMTP shown in FIG. 4A.
Figure 5:
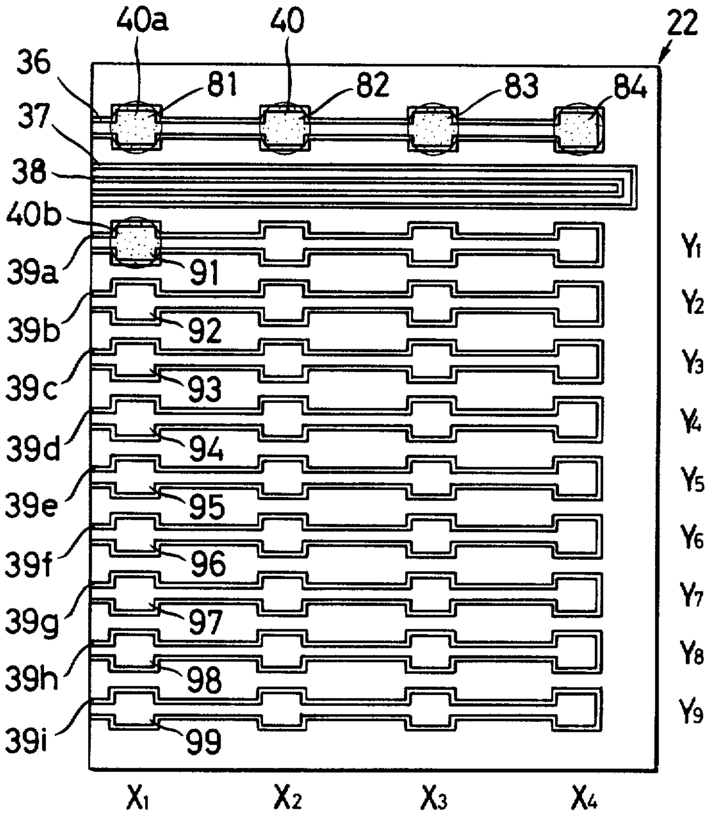
FIG. 5 is a plan view to show an address-plate of a magnetic thin platelet, which will be called AMTP hereafter, of the magnetic memory apparatus shown in FIG. 3.

Now another embodiment of magnetic memory apparatus according to this invention will be explained with reference to FIG. 3. Said magnetic memory apparatus comprises, as main elements, a light source 27, a polarizer 21, AMTP 22, MMTP 23, an analyser 24, a light detector 25, a coil 26 to generate bias magnetic field, a signal switching circuit 29, and a detecting circuit 30. The AMTP 22 and MMTP 23 are fabricated from the plate of orthoferrite, $Sm_{0.55}Tb_{0.45}FeO_3$, with the thickness of about 50 microns. CLC 31a, 32a, 31b, 32b, 31c, 32c, 31d and 32d in the form of metallic thin film are provided on the surface of the MMTP 23 as shown in FIG. 4A, and CLC 33a, 33b, 33c, 33d, 33e, 33f, 33g, and 33h are provided on the reverse side of the MMTP 23 as shown in FIG. 4B. CLC 36, 37, 38, 39a, 39b, 39c, 39d , 39e, 39f, 39g, 39h and 39i, in the form of metallic thin film are provided on the surface of the AMTP 22 as shown in FIG. 5. The MMTP 23 and the AMTP 22 are so assembled that the regions of MMTP 23 for CMD and the regions of AMTP 22 for CMD are corresponding each other. The patterns of the CLC will be explained later. The coil 26 for the generation of bias magnetic field is arranged to surround the AMTP 22 and the MMTP 23. The coil 26 is used to generate CMD in the AMTP 22 and the MMTP 23.

The optical system of this embodiment comprises the light source 27 which could irradiate a large area, the polarizer 21, the analyser 24 and the light detector 25, wherein the light beam from the light source 27 is linearly polarized by the polarizer 21, transmitted through a stack of AMTP 22 and MMTP 23, and through analyser 24, and detected by the light detector 25 comprising a photo diode. That is, the optical system is assembled so that the plane of polarization of the polarized light is rotated by the angle of $\theta \times 2$ by Faraday effect when CMD are present in both AMTP 22 and MMTP 23 and this polarized light could be detected by the light detector 25 after transmitting through the analyser 24. In this case $\theta$ represents the angle of rotation of the plane of polarization of the polarized light by transmission through single CMD in AMTP 22 or MMTP 23. The angle of rotation of the plane of polarization of the polarized light transmitting through AMTP 22 or MMTP 23, in the state where no CMD is present, is $-\theta$. Said apparatus is provided with a means to move the CMD regularly through AMTP 22 according to the signal from signal switching circuit 29 to detect the CMD in each of the predetermined regions of MMTP 23. Also said apparatus is constructed to detect the output signal from light detector 25 by the detecting circuit 30 synchronizing with the signal of signal switching circuit 29.

Now the CLC 31a, 32a, 31b, 32b, 31c, 32c, 31d, 32d, 33a, 33b, 33c, 33d, 33e, 33f, 33g and 33h of the MMTP 23, which were explained in general, will be explained in more detail. On the surface of the MMTP 23, CLC 31a, 32a, 31b, 32b, 31c, 32c, 31d and 32d are provided in matrix arrangement. In the matrix, vertical rows of $X_1$, $X_2$, $X_3$ and $X_4$, each constituted from one pair of vertical rows of $A_1$ and $A_2$, are arranged horizontally, and horizontal rows $Y_1$, $Y_2$, $Y_3$, $Y_4$, $Y_5$, $Y_6$, $Y_7$ and $Y_8$ are arranged vertically. By taking the row $X_1$ as example for explanation, the CLC 31a which forms row $A_1$, and the CLC 32a which forms row $A_2$, are fabricated by thin metallic films with thickness of about 12.5 microns. By each of the CLC 31a and 32a, rectangular regions 41, 42, 43, 44, 45, 46, 47 and 48, and rectangular regions 51, 52, 53, 54, 55, 56, 57 and 58 are formed in the sites corresponding to the rows $Y_1 - Y_8$. The regions 41 – 48 and domains 51 – 58 are formed as the rectangular shape about 50 microns wide and about 62.5 microns high. The distance between CLC 31a which forms the regions 41 – 48, and CLC 32a which forms the domains 51 – 58, is about 12.5 microns. Four dots 34 of ferromagnetic thin film are provided in each of the regions 41 – 48 and 51 – 58. Permalloy dots with a thickness of about 4000 A are suitable for the ferromagnetic dots 34. The purpose of the dots is to stabilize the CMD. Though the above explanation is only concerned with the row $X_1$, the other rows $X_2$, $X_3$ and $X_4$ are also constructed similarly.

Also constructed similarly with the patterns shown in FIG. 4B are provided on the reverse side of the EMTP 23. In FIG. 4B, the patterns of CLO on the surfaces of the MMTp 23 are neglected in the drawing in order to show the patterns of CLC on the reverse side clearly. As shown in FIG. 4B, plural rectangular-shaped regions 61–68 and 71–78 are formed by the CLC 33a–33h. The regions 61–68 and 71–78 are arranged to correspond to the regions 41–48 and 51–58 formed on the surface. That is, the regions 41 and 61, the regions 42 and 62, the regions 43 and 63, the regions 44 and 64, the regions 45 and 65, the regions 46 and 66, the regions 47 and 67, the regions 48 and 68, the regions 51 and 71, the regions 52 and 72, the regions 53 and 73, the regions 54 and 74, the regions 55 and 75, the regions 56 and 76, the regions 57 and 77, and the regions 58 and 78 are arranged to correspond with each other. Though the above statement describes row $X_1$, rows $X_2$, $X_3$ and $X_4$ are also fabricated similarly.

The AMTP 22 is provided with CLC 36, 37, 38 and 39a–39i with the patterns shown in FIG. 5. The CLC 36 is fabricated so that the rectangular regions 81, 82, 83 and 84 are arranged on rows $X_1$, $X_2$, $X_3$ and $X_4$ respectively. The CLC 37 is fabricated to have the spacing of about 12.5 microns between CLC 36 and CLC 37. CLC 38 is provided so that it is surrounded by the CLC 37. The spacing between the CLC 37 and the 38 is about 12.5 microns. CLC 39*a*, 39*b*, 39*c*, 39*d*, 39*e*, 39*f*, 39*g*, 39*h* and 39*i* are arranged to correspond to the rows of $Y_1$, $Y_2$, $Y_3$, $Y_4$, $Y_5$, $Y_6$, $Y_7$, $Y_8$ and $Y_9$. The regions 91, 92, 93, 94, 95, 96, 97, 98 and 99 are formed by respective CLC 39*a*, 39*b*, 39*c*, 39*d*, 39*e*, 39*f*, 39*g*, 39*h* and 39*i* to correspond to the row $X_1$. The region 99 is provided for the purpose of only moving CMD existing in the region 98 to said domain 99 and doesn't compose a part of the matrix. These regions 91, 92, 93, 94, 95, 96, 97 and 98 are provided to correspond to the regions 41, 42, 43, 44, 45, 46, 47 and 48 of the row $X_1$ in the MMTP 23 respectively. That is, the regions 41 and 91, the regions 42 and 92, the regions 43 and 93, the regions 44 and 94, the regions 45 and 95, the regions 46 and 96, the regions 47 and 97, and regions 48 and 98 are provided to correspond to each other. Though the above description is given on row $X_1$, rows $X_2$, $X_3$ and $X_4$ are fabricated similarly. The AMTP 22 is covered by the light shielding materials excluding the regions 91, 92, 93, 94, 95, 96, 97 and 98 of the row $X_1$ and also equivalent regions of rows $X_2$, $X_3$ and $X_4$. In FIG. 5, the light shielding material is omitted to show the CLC clearly.

Now the method of operation and action of the magnetic memory apparatus are explained in the following statement. First, CMD are generated in the thin plate AMTP 22 and MMTP 23 by application of the magnetic field of about 42 oersted on to the AMTP 22 and MMTP 23 by the coil 26. Next, CMD 35 is placed in the region 41 or 51, the region 42 or 52, the region 43 or 53, the region 44 or 54, the region 45 or 55, the region 46 or 56, the region 47 or 57, and the region 48 or 58 of the MMTP 23. Though above statement is given on the row $X_1$, CMD 35 is also placed in each region of the row $X_2$, $X_{3\ 4}$or $X_4$ similarly. Whether the CMD 35 are placed in predetermined regions, that is regions predetermined or not, is determined by the program. Electric current is passed through the CLC 31*a*, 31*b*, 31*c*, 31*d*, 32*a*, 32*b*, 32*c* and 32*d* on the surface of the MMTP 23 and the CLC 33*a*, 33*b*, 33*c*, 33*d*, 33*e*, 33*f*, 33*g* and 33*h* on the reverse side of the MMTP 23 selectively in order to place the CMD 35 in the predetermined address. For example, by the passing of electric current through the CLC 31*a* and the CLC 33*a*, the CMD 35 could be placed in the region 41. In other words, the CMD 35 could be placed in the region at an intersection of the matrix. By the above-mentioned method, the MMTP 23 in which the information is stored in each address could be prepared. The polarizer 21, the AMTP 22, the MMTP 23, the analyser 24 and the light detector 25 are aligned parallel to each other as shown in FIG. 3 to read out the information from the above-mentioned address of the MMTP 23. The AMTP 22 and MMTP 23 are aligned so that the addresses on said AMTP 22 and MMTP 23 are corresponding respectively. In the AMTP 22, exsistence of CMD are limited only in the regions 81, 82, 83 and 84 which are formed by the CLC 36. Then, in the abovementioned state, all or a limited portion of the polarizer 21 is irradiated by the parallel light beam 28 generated by the light source 27. The parallel light beam 28 irradiates the AMTP 22 after being linearly polarized by the polarizer 21.

Now if the CMD is not present in the addresses of the row $X_1$, that is, the regions 91–98, and equivalent addresses of regions of the rows $X_2$, $X_3$ and $X_4$ of the AMTP 22, addresses of row $X_1$ (that is regions 41 - 48) and equivalent addresses or regions of $X_2$, $X_3$ and $X_4$ of the MMTP 23 are irradiated by the same conditioned polarized light. In other words, if the angle of rotation of the plane of polarization of the polarized light is defined as $-\theta$ when transmitted through the AMTP 22 of the state in which the CMD is not present, MMTP 23 is irradiated by the polarized light of which plane of polarization is rotated by the angle of $-\theta$. Since CMD 35 is present in some of the addresses of the MMTP 23 and not present in remaining addresses, if the angle of rotation of the plane of polarization of the polarized light transmitted through the regions of the MMTP 23 with CMD present is defined as $\theta$, and the angle of rotation of the plane of polarization of the polarized light transmitted through the region of the MMTP 23 without CMD is defined as $-\theta$, polarized light without the rotation of the plane of polarization is obtained from the regions with CMD present, and polarized light with the plane of polarization being rotated by the angle of $-2\theta$ is obtained from the regions without CMD. This transmitted light irradiates the analyser 24. Since the analyser plate 24 and the polarizer 21 are aligned so that the polarized light is transmitted only when its plane of polarization is rotated by the angle of $2\theta$, and being detected by light detector 25, so no output signal is obtained from the light detector 25. In other words, information could not read out from the addresses of the MMTP 23.

Therefore the CMD is placed selectively in the AMTP 22 to obtain the polarized light rotated by the angle of $2\theta$ in this embodiment. By placing CMD in addresses of row $X_1$ of the AMTP 23, that is regions 91–98, and equivalent addresses, or regions, of rows $X_2$, $X_3$ and $X_4$ successively, in other words by scanning each address by CMD, the polarized light with the angle of rotation of $2\theta$ is obtained only when the CMD is present in both the AMTP 22 and MMTP 23, and the output signal from the light detector is obtained.

Figure 6A:
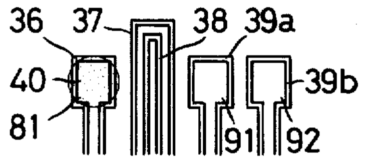
FIGS. 6A, 6B, 6C, 6D and 6E are partial plan views to illustrate the movement of CMD in the AMTP shown in FIG. 5.
Figure 6B:
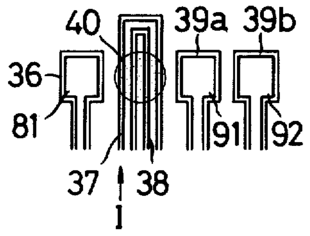
Figure 6C:
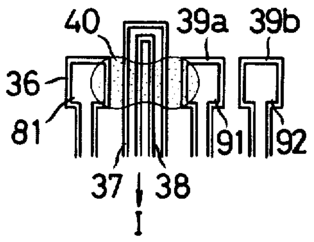
Figure 6D:
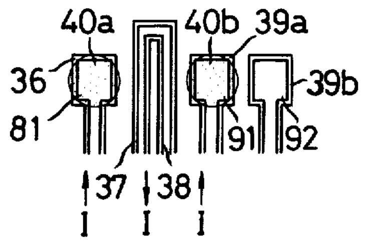
Figure 6E:
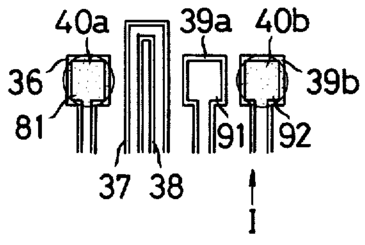

Now the method of moving the CMD in the AMTP 22 will be explained according to FIG. 6A–FIG. 6E which are prepared to illustrate the part of FIG. 5. By the flow of the electric current through the CLC 37 in the state where CMD 40 is present in region 81, which is formed by CLC 36, as shown in FIG. 6A, the CMD moves to the region of CLC 38 as shown in FIG. 6B. Then by the flow of electric current through CLC 38, the CMD 40 expands in right and left direction as shown in FIG. 6C. By the flow of the electic current through CLC 36 and CLC 39*a* at the above-mentioned state, the CMD 40 is separated to form two CMD, namely CMD 40*a* and CMD 40*b* as shown in FIG. 6D. Finally the CMD 40*a* is placed in the region 81 and the CMD 40*b* is placed in the domain 91. Then by the flow of the electric current through CLC 39B, the CMD 40*b* moves to region 92 as shown in FIG. 6E. In order to move the CMD 40*b* to the regions 93–99 successively, multi-phase current such as three phase alternating current is applied to CLC 39*a* – 39*i* successively. In this embodiment, CMD move on each region of rows $X_1$, $X_2$, $X_3$ and $X_4$ simultaneously. Therefore, if CMD is present in one of the addresses of the row of the MMTP 23, which are corresponding to the addresses of row $Y_1$ of the AMTP 22, an output signal is obtained from the light detector 25. The electric current to flow through CLC 36, 37, 38 and 39*a* – 39*i* successively is obtained from the signal switching circuit 29 shown in FIG. 3. Now the phenomena occurring when the existence of CMD in the MMTP 23 are detected by the signal of signal switching circuit 29 will be explained. When the CMD 40*b* is present in row $Y_1$ of the AMTP 22 at time $t_1$, and also CMD 35 is present in any one of the regions in row $Y_1$ of the MMTP 23 at the same instant, that is when CMD 40b in the AMTP 22 and CMD 35 in the MMTP 23 are present on the passage of upper light beam 28 as shown in FIG. 3, the plane of polarization of polarized light being linearly polarized by the polarizer 21, is notated by the angle of $2\theta$, and the output signal could be obtained from the light detector 25. And the detector circuit 30 shows that the output signal is obtained from the light detector 25 at time $t_1$. In other words, it could be detected that the CMD is present in one of the regions of row $Y_1$ of the MMTP 23. Also when the CMD 40*b* is present in the region of row $Y_8$ of AMTP 22 at time $t_2$, and no CMD is present in any of the regions of row $Y_8$ of the MMTP 23 at the same instant, that is when on the passage of lower light beam 28, CMD 40*b* is present in the AMTP 22, and no CMD is present in MMTP 23, the plane of polarization of the light beam being linearly polarized by the polarizer 21, is rotated by the angle of $\theta$ by transmitting through the AMTP 22, then again rotated by the angle of $-\theta$ by transmitting through the MMTP 23 without CMD. Therefore the polarized light incidents to the analyser 24 with no rotation of the plane of polarization. Since the direction of the optical axis of the polarizer 21 and the analyser plate 24 are aligned to have the best transmittance of polarized light through said analyser 24 when the plane of polarization of the polarized light transmitted through the polarizer 21 is rotated $2\theta$, no output signal is obtained from the light detector 25 at time $t_2$. Therefore, it could be detected that no CMD is present in any regions of row $Y_8$ of the MMTP 23, by the detecting circuit 30.

Figure 7:
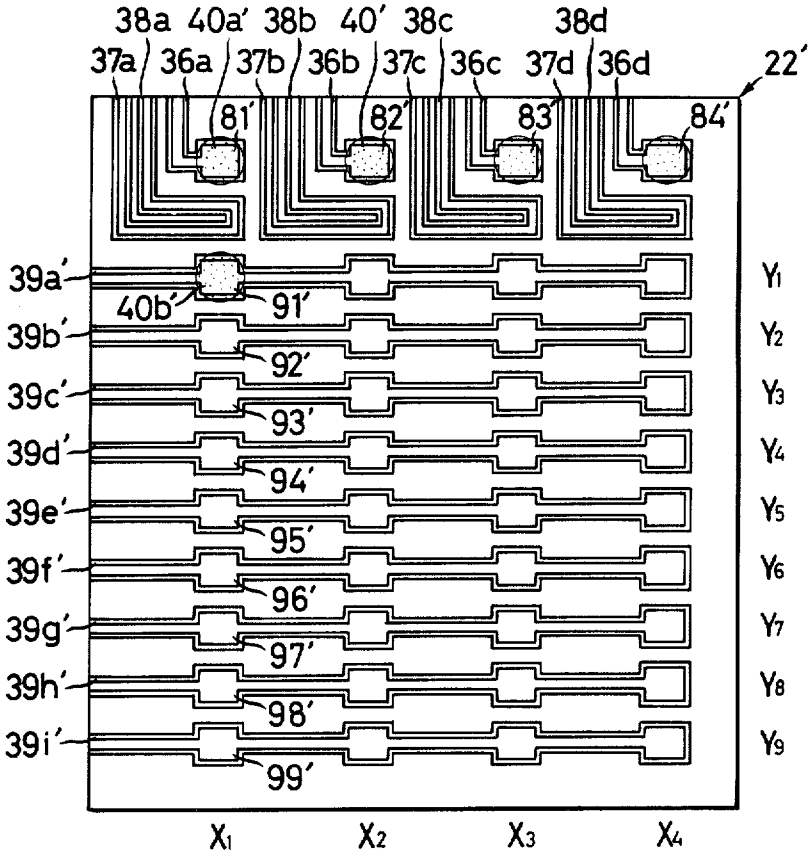
FIG. 7 is a plan view of another embodiment of AMTP in accordance with this invention.

In FIG. 7, AMTP 22', a modification of said AMTP 22, is shown. The AMTP 22 is constructed so that the CMD could be moved in each region of rows $X_1$, $X_2$, $X_3$ and $X_4$ independently. That is, in row $X_1$ region 81' is formed by CLC 36*a*, region 82' is formed in row $X_2$ by CLC 36*b*, domain 83' is formed in row $X_3$ by CLC 36*c*, and region 84' is formed in row $X_4$ by CLC 36*d*. And in order to move CMD 40' and to generate CMD 40*a'* and CMD 40*b'* CLC 37*a* and CLC 38*a*, CLC 37*b* and CLC 38*b*, CLC 37*c* and CLC 38*c*, and CLC 37*d* and CLC 38*d* are provided in rows $X_1$, $X_2$, $X_3$ and $X_4$ respectively. Also regions 91' – 99' are provided at the intersections of rows $Y_1$ – $Y_9$ and rows $X_1$, $X_2$, $X_3$ and $X_4$ by CLC 39*a'* – 39*i'*.

By using the above-mentioned AMTP 22' in the place of MMTP 22, existence of CMD in each region of the MMTP 23 could be detected by the unit of region not by the unit of row in the former embodiment. The detection of CMD in MMTP 23' using the AMTP 22' is done by the following method. First, CMD 40' in the region 81' of row $X_1$ is separated into two CMD 40*a'* and 40*b'*, the second CMD 40*b'* is moved successively in the regions 91' – 99' in row $X_1$, and after movement in row $X_1$ is finished the CMD 40*b'* is moved in rows $X_2$, $X_3$ and $X_4$ successively in similar manner. In other words the regions of rows $X_1$, $X_2$, $X_3$ and $X_4$ are scanned by CMD. By said scanning, existence of CMD 35 in each region of the MMTP 23 could be detected.

Figure 8:
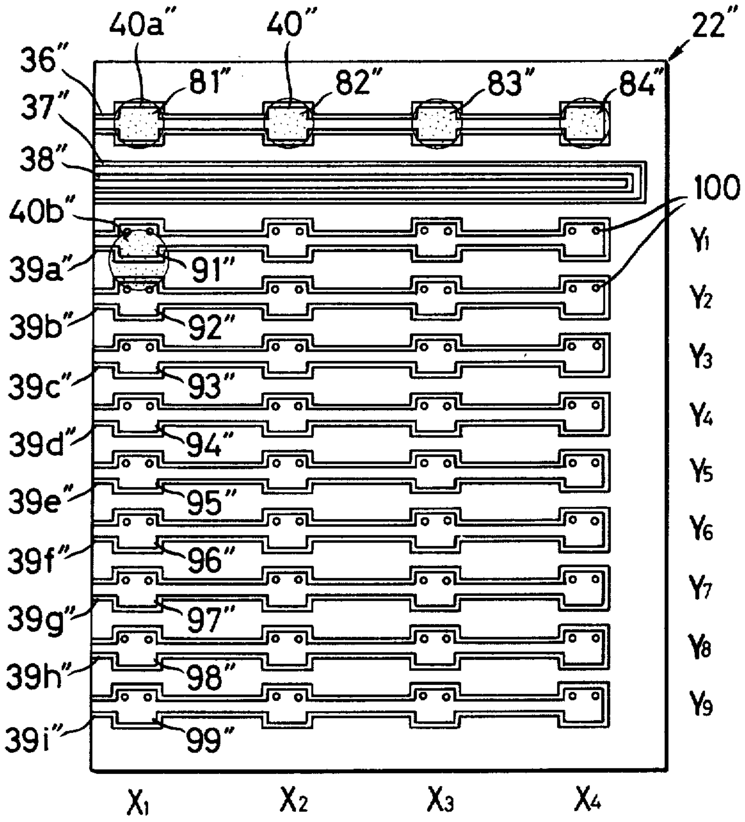
FIG. 8 is a plan view of still another embodiment of AMTP in accordance with this invention.

In FIG. 8, the AMTP 22'', the modification of the AMTP 22 shown in FIG. 5, is shown. Since AMTP 22'' shown in FIG. 8 is almost identical to the MMTP 22 shown in FIG. 5, the components of AMTP 22'' which act similarly with the components of AMTP 22 are marked by two prime like 81'' in reference to 81 in the AMTP 22. A characteristic feature of the AMTP 22'' compared to the AMTP 22 is the addition of thin film dots 100 of high magnetic permeability material such as permalloy. Since CMD 40*b''* are displaced to the direction of the movement of the CMD 40*b''* by the addition of the dots 100, the CMD 40*b''* could be moved in one direction only by applying the alternating current of reverse phase to the adjacent CLC. In other words, scanning by the CMD 40*b''* could be done by the two phase driving method.

Although embodiments of this invention have been described in detail with reference to the accompanying drawings, it is to be understood that the invention is not limited to the details shown and described, and that various changes and modifications can be made. For instance, it is possible to irradiate only the predetermined region of the magnetic thin platelet by the light beam from light source 27, instead to of irradiating the entire area of said magnetic thin platelet. And the light beam could be varied intermittently, and also the method of writing with CMD on MMTP could be varied to other suitable methods. Further, said CLC of X rows and Y rows of said MMTP could be provided on the same surface by inserting the electric insulator between them instead of providing on the surface and reverse side as mentioned before. AMTP and MMTP could be constructed as shown in FIGS. 9A – 9D.

Figure 9A:
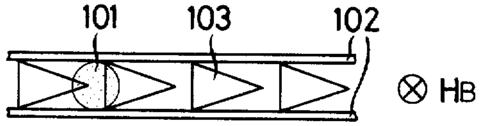
FIGS. 9A, 9B, 9C and 9D are partial plan views to illustrate the movement of CMD in another embodiment of MTP provided with another means to move CMD.
Figure 9B:
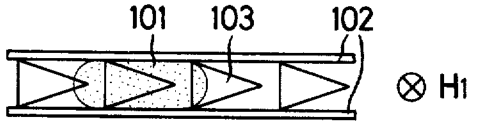
Figure 9C:
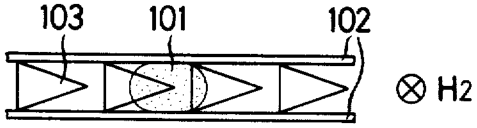
Figure 9D:
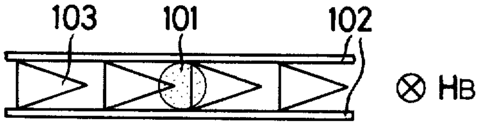

In FIGS. 9A – 9D the part of the means to move CMD is shown. This part for moving CMD is fabricated by adding two parallel strips of high permeability magnetic thin films 102, such as thin films of permalloy, on MTP, and further providing the triangular shaped magnetic thin film 103 between the two parallel strips of magnetic thin films 102. To move the CMD 101 on the MTP, first the condition is changed from the state of bias magnetic field of $H_B$ for the stable generation of CMD 101 in MTP as shown in FIG. 9A to the state of bias magnetic field of $H_1$ as shown in FIG. 9B, provided $H_B>H_1$. As a result, the CMD 101 is stretched to the right direction as shown in FIG. 9B. Then by applying the bias magnetic field of $H_2$ as shown in FIG. 9C, provided $H_B>H_2>H_1$, the CMD 101 is shifted from the original site shown in FIG. 9A to the next right site with spacing corresponding to the length of one triangular shaped magnetic thin film. Next, by applying the bias magnetic field $H_B$ as shown in FIG. 9D, the CMD 101 is held in stable condition in the shifted state. Though the above description explains the movement of CMD in the one pitch distance, the CMD 101 could be moved successively to the right direction by repeating the abovementioned operation.

AMTP and MMTP could be constructed as shown in FIGS. 10A–10E.

Figure 10A:
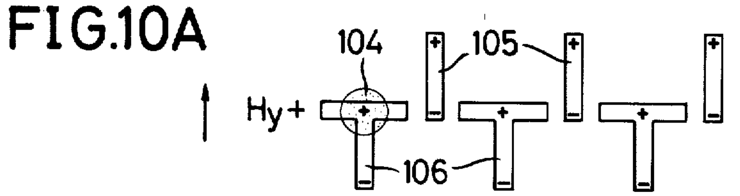
FIGS. 10A, 10B, 10C, 10D and 10E are partial plan views to illustrate the movement of CMD in still another embodiment of MTP provided with still another means to move CMD.
Figure 10B:
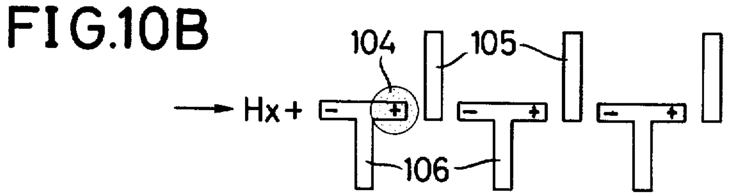
Figure 10C:
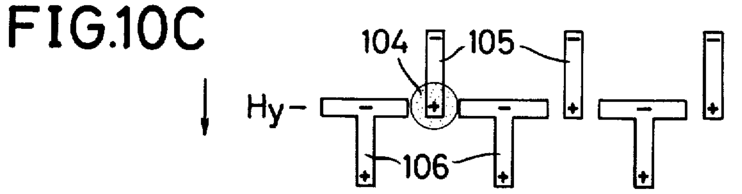
Figure 10D:
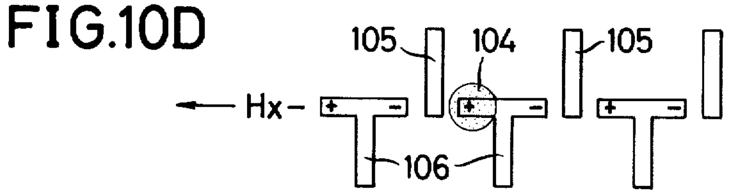
Figure 10E:
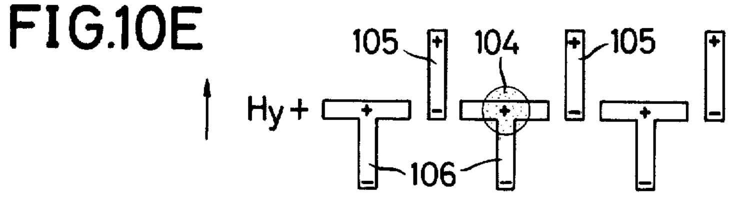

FIGS. 10A–10E show the part of the means for the movement of CMD. Said means to move CMD is provided by adding the I-shaped and T-shaped magnetic thin film 105 and 106 of high permeability magnetic materials such as permalloy on the MTP. To move the CMD 104 in the MTP, the CMD 104 is held in stable state on the T-shaped magnetic thin film 106 by applying the magnetic field +Hy parallel to the paper of this drawing as shown in FIG. 10A. Then by applying the magnetic field $+H_x$ directing to the right as shown in FIG. 10B, the CMD 104 is shifted to the right side of T-shaped magnetic thin film 106. By applying the magnetic field $-H_y$ directing below as shown in FIG. 10C, the CMD 104 is shifted to said I-shaped magnetic thin film 105. By applying the magnetic field $-H_x$ directing to the left as shown in FIG. 10D, the CMD 104 is shifted to the left side of T-shaped magnetic thin film 106. By applying the magnetic field $+H_y$ directing upward as shown in FIG. 10E, the CMD 104 is shifted to the center of T-shaped magnetic thin film 106 and is held in stable state. By the above-mentioned processes the CMD could be moved in one direction.

What is claimed is:

1. An electric apparatus using magnetic materials comprising:

a plurality of magnetic thin platelets arranged along a single central axis so as to form a stack;

means for producing cylindrical magnetic domains on each of said platelets;

pairs of conductive loop circuits carried by each of said platelets so as to form rows of paired regions in a matrix extending in an X direction;

other conductive loop circuits carried by each of said platelets so as to form rows of regions in a matrix extending in a Y direction, said regions in said Y-rows being respectively aligned with each of said paired regions in said X-rows;

said pairs of conductive loop circuits forming regions in said X-rows and said other conductive loop circuits forming regions in said Y-rows for selectively moving said domains to and positioning said domains in a set of aligned regions including a predetermined one of said paired regions from another set of aligned regions including another one of said pairs by applying a current to the one of said pairs of conductive loop circuits forming said one region while simultaneously applying current to one of said other conductive loop circuits forming the region axially aligned with said one of said paired regions;

means for irradiating each of said platelets with polarized light passing through each of said regions in a direction generally parallel to said axis; and means for detecting the presence of said domains in said regions on each of said platelets by detecting the rotation of the angle of the plane of polarization of polarized light passing through said regions on each of said platelets.

2. The electric apparatus of claim 1 wherein said pairs of conductive loop circuits are located on one surface of said platelets and said other loop circuits are located on the other surface.

3. The electric apparatus using magnetic materials of claim 1 wherein the existance and non-existance of said domain in each of said regions formed by said conductive loop circuits correspond to logic values 1 and 0.

4. The electric apparatus using magnetic materials of claim 1 wherein each of said magnetic thin platelets comprises a thin plate of orthoferrites.

5. The electric apparatus using magnetic materials of claim 1 wherein said regions are provided with dots of ferromagnetic thin film.

6. The electric apparatus using magnetic materials of claim 1 wherein said magnetic thin platelets are used as a logic circuit gate.

7. An electric apparatus using magnetic materials comprising:

a memory plate comprising a magnetic thin platelet;

an address plate comprising a magnetic thin platelet disposed in generally parallel relation with said memory plate;

means for producing cylindrical magnetic domains on said address plate;

a first conductive loop circuit for a source of said domain carried by said address plate;

second conductive loop circuits carried by said address plate to form addressable regions;

a pair of rectangular inner and outer conductive loop circuits carried by said address plate severing said domains into two sections and disposed between said first conductive loop circuit and the first of said second conductive loop circuits;

a third conductive loop circuit carried by said address plate for moving said domains on the last of said second conductive loop circuits to a region formed by said third conductive loop circuit whereby said addressable regions are scanned by said cylindrical magnetic domains in such a manner that a current is applied to said first conductive loop circuit, sequentially to said rectangular outer conductive loop circuit and to said rectangular inner conductive loop circuit, and then to said first conductive loop circuit, said rectangular inner conductive loop circuit and the first of said second conductive loop circuits, and then a multi-phase current is applied successively to each of said second conductive loop circuits and said third conductive loop circuit;

said memory plate including means for moving said cylindrical magnetic domains in predetermined regions of said memory plate;

said respective predetermined regions of said memory plate and addressable regions of said address plate being aligned in a direction generally perpendicular to said address plate and said memory plate;

means for irradiating said memory plate and said address plate with plane polarized light passing through said memory plate and said address plate in a direction generally perpendicular to said memory plate and said address plate; and means for detecting the rotation of the angle of polarization of plane polarized light passing through said memory plate and said address plate, whereby said addressable regions are scanned by said cylindrical magnetic domains and the presence of a domain in one of said respective regions of said memory plate is detected.

8. The electric apparatus using magnetic materials of claim 7 wherein said memory plate and said address plate each comprise a thin magnetic plate of orthoferrite.

9. The electric apparatus using magnetic materials of claim 7 wherein said regions of said memory plate and said address plate are provided with dots of ferromagnetic thin film.

10. The electric apparatus using magnetic materials of claim 7 wherein said dots of ferromagnetic thin film are disposed on one side in each of said addressable regions.

* * * * *

UNITED STATES PATENT OFFICE
CERTIFICATE OF CORRECTION

Patent No. 3,902,166 Dated November 18, 1975

Inventor(s) Zeniti Kiyasu and Homare Tsuruhara

It is certified that error appears in the above-identified patent and that said Letters Patent are hereby corrected as shown below:

Col. 1, line 18, "CED" should be --CMD--.

Col. 2, line 51, "CED" should be --CMD--.

Col. 3, line 37, the word "provided" should be --produced--;
line 57, delete the word "plate";
line 63, after the word "upper" insert --regions 11A--.

Col. 4, line 46, "CED" should be --CMD--.

Col. 6, line 44, delete "Also constructed similarly" and insert --The CLC 33a-33h--;
line 46, "CLO" should be --CLC--;
line 47, the "p" after --MMTP-- should be capitalized.

Col. 7, line 11, the word "domain" should be --region--.

Col. 8, line 57, the word "domain" should be --region--.

Col. 9, line 33, delete the word "plate";
line 46, the word "domain" should be --region--.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*